US009363519B2

(12) United States Patent
Oztaskent et al.

(10) Patent No.: US 9,363,519 B2
(45) Date of Patent: Jun. 7, 2016

(54) DETECTING DISPLAYED CHANNEL USING AUDIO/VIDEO WATERMARKS

(75) Inventors: Ant Oztaskent, Sutton (GB); Yaroslav Volovich, Cambridge (GB)

(73) Assignee: GOOGLE INC., Mountain View, CA (US)

( * ) Notice: Subject to any disclaimer, the term of this patent is extended or adjusted under 35 U.S.C. 154(b) by 106 days.

(21) Appl. No.: 13/174,544

(22) Filed: Jun. 30, 2011

(65) Prior Publication Data
US 2015/0193899 A1 Jul. 9, 2015

Related U.S. Application Data

(60) Provisional application No. 61/470,935, filed on Apr. 1, 2011.

(51) Int. Cl.
| | |
|---|---|
| *H04N 7/00* | (2011.01) |
| *H04N 19/124* | (2014.01) |
| *H04N 19/136* | (2014.01) |
| *H04N 19/46* | (2014.01) |
| *H04N 21/439* | (2011.01) |
| *H04H 60/33* | (2008.01) |
| *H04H 60/45* | (2008.01) |
| *G06Q 30/02* | (2012.01) |
| *H04N 21/442* | (2011.01) |
| *H04N 19/467* | (2014.01) |

(52) U.S. Cl.
CPC ............ *H04N 19/124* (2014.11); *G06Q 30/02* (2013.01); *H04H 60/33* (2013.01); *H04H 60/45* (2013.01); *H04N 19/136* (2014.11); *H04N 19/46* (2014.11); *H04N 19/467* (2014.11); *H04N 21/4394* (2013.01); *H04N 21/44222* (2013.01); *G06T 2201/005* (2013.01)

(58) Field of Classification Search
CPC ....... H04H 60/58; H04H 60/33; H04H 60/45; H04N 5/60; H04N 21/4394; H04N 21/44222; H04N 19/467; H04N 19/46; H04N 19/136; H04N 19/12; G06Q 30/02; G06Q 30/024
See application file for complete search history.

(56) References Cited

U.S. PATENT DOCUMENTS

| | | | |
|---|---|---|---|
| 8,108,888 B2* | 1/2012 | Ramaswamy | 725/19 |
| 8,150,096 B2* | 4/2012 | Alattar | 382/100 |
| 8,302,120 B2* | 10/2012 | Ramaswamy | 725/10 |
| 8,769,584 B2* | 7/2014 | Neumeier et al. | 725/60 |
| 2006/0268895 A1* | 11/2006 | Kotzin | H04N 5/445 370/395.64 |
| 2007/0220575 A1* | 9/2007 | Cooper et al. | 725/118 |
| 2009/0013345 A1* | 1/2009 | Chen et al. | 725/19 |
| 2009/0172405 A1* | 7/2009 | Shiomi et al. | 713/176 |
| 2009/0210899 A1* | 8/2009 | Lawrence-Apfelbaum et al. | 725/34 |

(Continued)

*Primary Examiner* — Rong Le
(74) *Attorney, Agent, or Firm* — Morgan, Lewis & Bockius LLP (57) ABSTRACT

Methods and systems for determining what channel a user is viewing through a TV receiver are described. At the TV receiver, a plurality of TV signals is received. A channel selection is received. The TV receiver tunes to the selected channel from among the plurality of TV signals. A watermark is inserted into a component of the tuned TV signal to form a modified TV signal, and the modified TV signal is output from the TV receiver. The watermark encodes meta-information associated with the tuned TV signal. In some implementations, the modified TV signal is received by a computer system. The watermark from the modified TV signal is processed to decode the meta-information, and the meta-information is provided to an application running on the computer system.

12 Claims, 7 Drawing Sheets

(56) References Cited

U.S. PATENT DOCUMENTS

2010/0263008 A1* 10/2010 Meuninck et al. ............ 725/110
2011/0115977 A1* 5/2011 Simpson et al. ............... 348/564
2012/0210378 A1* 8/2012 McCoy et al. ................. 725/109

* cited by examiner

DETECTING DISPLAYED CHANNEL USING AUDIO/VIDEO WATERMARKS

RELATED APPLICATIONS

This application claims priority to U.S. Provisional Patent Application Ser. No. 61/470,935, filed Apr. 1, 2011, entitled "Detecting Displayed Channel Using Audio/Video Watermarks", which is incorporated by reference herein in entirety.

TECHNICAL FIELD

The disclosed ideas relate generally to detecting meta-information, and in particular detecting information about a channel that is being displayed.

BACKGROUND

Television content is delivered to users in many different ways, and in many different formats. For example, a user may subscribe to a cable or satellite television service to access high definition or alternative language versions of certain channels. While cable or satellite receivers may be able to identify the channel that a user is watching, such TV receivers often do not send this information to the television or other attached media devices. Often, they send only a bare TV signal without additional meta-information, so that other devices are unable to determine what channel is being viewed. In some cases, televisions or other media devices may benefit from having access to meta-information of the viewed channel in order to customize a user experience based at least in part on that information.

Accordingly, it is highly desirable to provide systems and methods to determine what channel a TV receiver is outputting for display to a viewer.

SUMMARY

The above deficiencies and other problems associated with determining what channel is being displayed through a TV receiver are reduced or eliminated by the disclosed methods and devices.

Methods and systems for determining what channel is being displayed through a TV receiver are described. Such methods and systems provide an effective way for a computer system to provide tailored content to users. Some implementations provide a TV receiver. At the TV receiver, a plurality of TV signals is received. A channel selection is received from a user. The TV receiver tunes to the selected channel from among the plurality of TV signals. A watermark is inserted into a component of the tuned TV signal to form a modified TV signal. The watermark encodes meta-information associated with the tuned TV signal. The modified TV signal is output from the TV receiver, or stored.

In accordance with some implementations, a computer system with one or more processors and memory is provided. A TV signal corresponding to a channel being displayed on a display device is received. The TV signal includes a watermark with encoded meta-information, where the meta-information is associated with the channel being displayed. The watermark is processed to decode the meta-information, and the meta-information is provided to an application running on the computer system.

In accordance with some implementations, a computer system with a microphone, one or more processors, and memory is provided. An audio stream is received with the microphone. The audio stream corresponds to an audio track of a channel being displayed on a display device. The audio stream also includes a watermark with encoded meta-information, where the meta-information is associated with the channel being displayed. The watermark is processed to decode the meta-information, and the meta-information is provided to an application running on the computer system.

In various implementations, the watermark is information, typically digital, such as a symbol or text, that is embedded into a digital signal, producing a marked, or modified, signal. In some implementations, the digital signal is an audio or video stream, or digital pictures. In some implementations, the watermark is difficult to remove from the digital signal. In some implementations, the watermark is perceptible to consumers (e.g., viewers and/or listeners) of the digital signal (e.g., as visible and/or audible information); in other implementations, the watermark is not perceptible to such consumers. Regardless of whether the digital watermark is perceptible, the watermark is detectable by a decoder. In some implementations, the watermark is decoded by a computer system or other digital device that receives the marked digital signal, often for playback to a user via a combination of a video and audio outputs (e.g., a video display or projector and/or audio speakers). In some implementations, the watermark is decoded by a set top box that receives the marked digital signal. In various implementations, the watermark is encoded using any known or equivalent methodology, such as spread-spectrum watermarking, (i.e., additive modification in a transform or time domain), quantization, and/or amplitude modulation (i.e., additive modification in a spatial domain). In various implementations, the watermark is decoded using any known or equivalent methodology that is compatible with a corresponding encoding methodology.

BRIEF DESCRIPTION OF THE DRAWINGS

Like reference numerals refer to corresponding parts throughout the drawings.

DESCRIPTION OF IMPLEMENTATIONS

Figure 1:
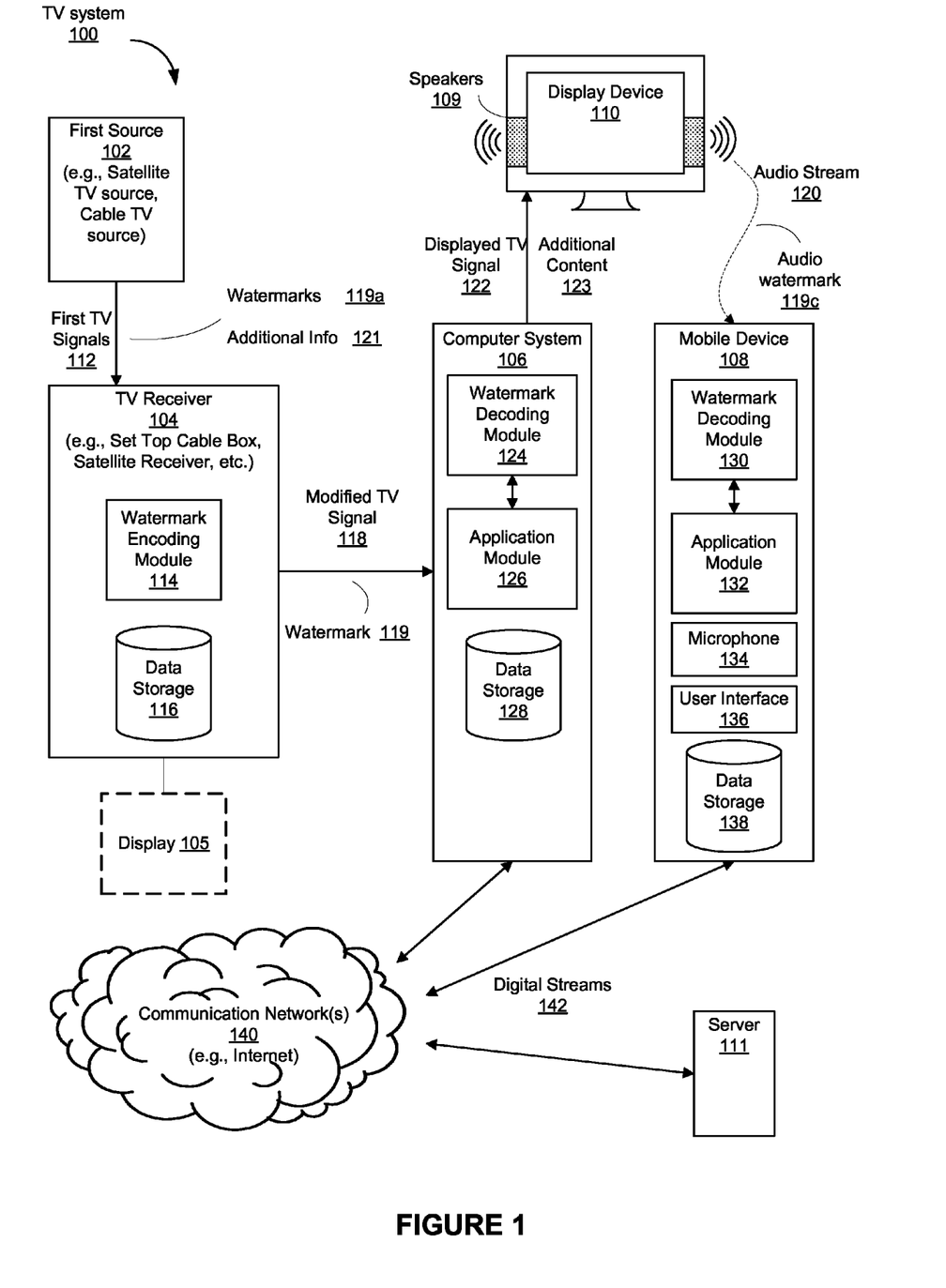
FIG. 1 is a block diagram illustrating the infrastructure of a TV system in accordance with some implementations.

Attention is directed to FIG. 1 which is a block diagram illustrating the functional components of a TV system 100 in accordance with some implementations. The TV system 100 includes: a first source 102, a TV receiver 104, a computer system 106, a mobile device 108, a display device 110, and a server 111.

It should be appreciated that the TV system 100 can be implemented as separate components or as parts of a single component. For convenience of illustration and explanation, the TV system 100 is described below as being implemented as separate components.

The first source 102 transmits first TV signals 112 to the TV receiver 104. For instance, in some implementations the first source 102 is a satellite TV source, a cable TV source, an Internet-based TV source, and/or an over-the-air broadcast source. The first TV signals 112 carry TV content, and they are transmitted to the TV receiver 104 via any suitable medium. For example, the first TV signals 112 can be transmitted from the first source 102 to the TV receiver 104 by electromagnetic waves (e.g., radio waves), optical systems (e.g., fiber optics), and/or electrical signals (e.g., traditional cable signal wiring). Furthermore, the first TV signals 112 may be transmitted by any combination of these technologies, so long as they are ultimately received by the TV receiver 104. As used herein, a TV signal is any data transmission that includes audio and/or video signal components corresponding to a TV channel. Components of a TV signal that correspond only to audio or video data are sometimes referred to herein as audio signals or video signals. In some implementations, as further described in reference to FIG. 2, the first source transmits to the TV receiver 104 one or more of: watermarks 119a and additional information 121 related to the first TV signals 112.

In some implementations, the TV receiver 104 is a set-top box that receives and decodes the TV signals 112 and outputs a modified TV signal 118 for presentation on a display device, such as display device 110. In some implementations, the TV receiver 104 is any one of a set-top box for receiving cable TV and/or satellite TV signals, a digital video recorder, a digital media receiver, a TV tuner for over the air TV signals, a computer, and/or any other device that receives, decodes and outputs TV signals. In some implementations, the TV receiver 104 includes data storage 116, such as any non-transitory computer readable storage medium for storing TV signals, meta-information (including channel information and additional TV program information). In some implementations, the TV receiver 104 is integrated with a display 105 on which the TV signals 118 are displayed.

In some implementations, the TV receiver 104 includes a watermark encoding module 114 for encoding a watermark 119 into a TV signal or a component of a TV signal, such as a video or audio TV signal component.

In various implementations, a watermark (e.g., the watermark 119) is information, typically digital, such as a symbol or text, that is embedded into a digital signal (e.g., the TV signal 112), producing a marked, or modified, signal (e.g., the modified TV signal 118). In some implementations, the digital signal is an audio or video stream, or digital pictures. In some implementations, the watermark is difficult to remove from the digital signal. In some implementations, the watermark is perceptible to consumers (e.g., viewers and/or listeners) of the digital signal (e.g., as visible and/or audible information); in other implementations, the watermark is not perceptible to such consumers. Regardless of whether the digital watermark is perceptible, the watermark is detectable by a decoder. In some implementations, the watermark is decoded by a computer system (e.g., the computer system 106) or other digital device that receives the marked digital signal (e.g., the mobile device 108), often for playback to a user via a combination of a video and audio outputs (e.g., a video display device 110 and/or audio speakers 109). In some implementations, the watermark is decoded by a set top box that receives the marked digital signal. In various implementations, the watermark is encoded using any known or equivalent methodology, such as spread-spectrum watermarking, (i.e., additive modification in a transform or time domain), quantization, and/or amplitude modulation (i.e., additive modification in a spatial domain). In various implementations, the watermark is decoded using any known or equivalent methodology that is compatible with a corresponding encoding methodology.

In some implementations, the watermark encoding module 114 generates the watermark 119. In some implementations, the watermark encoding module 114 receives a watermark that has been generated by another device (e.g., a watermark 119a output by the first TV source 102). In some implementations, the watermark encoding module 114 decodes or otherwise identifies information in the watermark 119a, and encodes the information into the watermark 119. In some implementations, the watermark encoding module 114 encodes the watermark 119 into a modified TV signal 118 that is then stored or output to a display device or another device, such as the computer system 106. When the watermark 119 is stored as part of a stored modified TV signal 118, the meta-information associated with the watermark is recoverable upon playback of the stored modified TV signal 118.

Watermarks 119 can be encoded into TV signals by any number of sources. For instance, sometimes a watermark 119a is encoded in the first TV signals 112 at the first source 102 by a TV content provider (e.g., a cable TV provider, a satellite TV provider, a broadcaster or Internet streaming site) prior to transmitting the first TV signals 112 to the TV receiver 104. In some implementations, a watermark 119a is encoded into a TV program by a TV content creator. For example, the producer of a particular TV program may encode watermarks into the content that the producer distributes to TV content providers, such as a cable TV provider or an over-the-air broadcaster. Accordingly, a TV receiver 104 in accordance with these implementations may not need to include a watermark encoding module 114 due to watermarks 119a already being encoded into the first TV signals 112. In some implementations, any combination of the above mentioned watermarking techniques are used. For example, a watermark encoding module 114 in a TV receiver 104 sometimes encodes additional watermarks into TV signals, modifies watermarks that already exist in TV signals, or simply passes through TV signals containing externally generated watermarks.

In some implementations, the TV receiver 104 outputs the modified TV signal 118 to one or more devices. In some implementations, the modified TV signal 118 is one of the first TV signals 112 with a watermark 119 encoded in the TV signal or a component of the TV signal. In some implementations, the TV receiver 104 merely passes one of the first TV signals 112 (or a TV signal decoded from the first TV signals 112) to the computer system 106 without encoding a watermark into the modified TV signal 118. For example, this might be the case when no meta-information is available for a first TV signal 112, or when the first TV signal 112 already includes watermarks 119a.

In some implementations, the TV system 100 includes a computer system 106. For example, in some implementations, the computer system 106 is a set-top box that is connected between a cable box and a TV. In some implementations, the computer system 106 is also coupled to one or more communication networks 140, such as the Internet. The computer system 106 includes a watermark decoding module 124 and an application module 126. The watermark decoding module 124 decodes watermarks 119 (and optionally watermarks 119a) contained in the modified TV signal 118. The computer system 106 also includes data storage 128, as described in greater detail below.

In some implementations, the computer system 106 outputs a displayed TV signal 122 to a display device 110. Often, the displayed TV signal 122 corresponds to the TV programming contained in the modified TV signal 118. In some implementations, the computer system 106 provides additional or alternative content 123 to a user through the display device 110. The additional content can include digital media files/streams or informational content and can be output to the display device 110 as part of the displayed TV signal or separately. In some implementations, the displayed TV signal 122 merely includes a TV signal corresponding to audio and/or video components of the modified TV signal 118. In some implementations, the additional or alternative content 123 includes screen overlays, advertisements, applications, multimedia (audio and/or video) content, etc. In some implementations, the additional content is downloaded by the computer system 106 from a server 111 via a communication network 140 based on information conveyed by one or more of the watermarks 119 in the modified TV signal 118.

In some implementations, the TV system 100 includes or interoperates with a mobile device 108. The mobile device 108 can be any one of: a remote control, a mobile phone, an audio player, a video player, a video game system, a laptop computer, a tablet computer, and/or any other handheld or portable electronic device. The mobile device 108 includes a watermark decoding module 130, an application module 132, a user interface 136, and data storage 138. The mobile device 108 also includes a microphone 134 that is capable of picking up the audio stream 120, where the audio stream 120 contains an audio watermark. Accordingly, in some implementations, the mobile device 108 is configured to receive the audio stream 120 through the microphone 134, and provide the audio stream 120 to the watermark decoding module 130. The watermark decoding module 130 then identifies, recovers, deciphers, or otherwise acquires the meta-information encoded into the audio stream. The mobile device 108 can also communicate with other components of the system 100 via a local area network, such as a wireless or wired network.

The TV system 100 also includes a display device 110. The display device 110 can be any display for presenting video and/or audio content to a user. In some implementations, the display device 110 is a television. In some implementations, the display device 110 is a computer monitor, LCD screen, tablet computer, mobile telephone, projector, and/or any other type of video display system. In some implementations, the computer system 106 is connected to the display device 110. In some implementations, the display device 110 includes the computer system 106. Stated in another way, in some implementations, the computer system 106 and the display device 110 are contained in a single device.

In some implementations, the display device 110 includes, or is otherwise associated with, speakers for outputting an audio stream 120. In some implementations, the audio stream 120 includes an audio watermark that can be detected and deciphered by a device. In some implementations, the watermark in the audio stream is encoded by TV content creators, TV content providers, and/or the watermark encoding module in the TV receiver 104.

In some implementations, the computer system 106 and the mobile device 108 use digital streams 142 to communicate via one or more communication network(s) 140 (e.g., the Internet) with a server 111. In some implementations, the computer system 106 and the mobile device 108 transmit to the server 111 meta-information associated with the modified TV signal 118 that was decoded by the watermark decoding modules 124, 130. In some implementations, the computer system 106 and the mobile device 108 transmit a watermark 119 extracted from the modified TV signal 118 to the server 111, so that the server 111 decodes the watermark to access the meta-information contained therein. In some implementations, in response to receiving or decoding the meta-information, the server 111 returns digital content, including: applications, media files, program information/metadata, and/or advertising associated with the TV channel.

Although FIG. 1 shows discrete components, FIG. 1 is intended more as functional description of the various features which may be present in a set of devices than as a structural schematic of the implementations described herein. In practice, and as recognized by those of ordinary skill in the art, items shown separately could be combined and some items could be separated. For example, some items (e.g., TV receiver 104 and/or computer system 106) shown separately in FIG. 1 could be implemented on the display device 110. Alternatively, single items could be implemented by one or more devices. The actual number of devices used to implement the TV system 100, and how features are allocated among them, will vary from one implementation to another.

Figure 2:
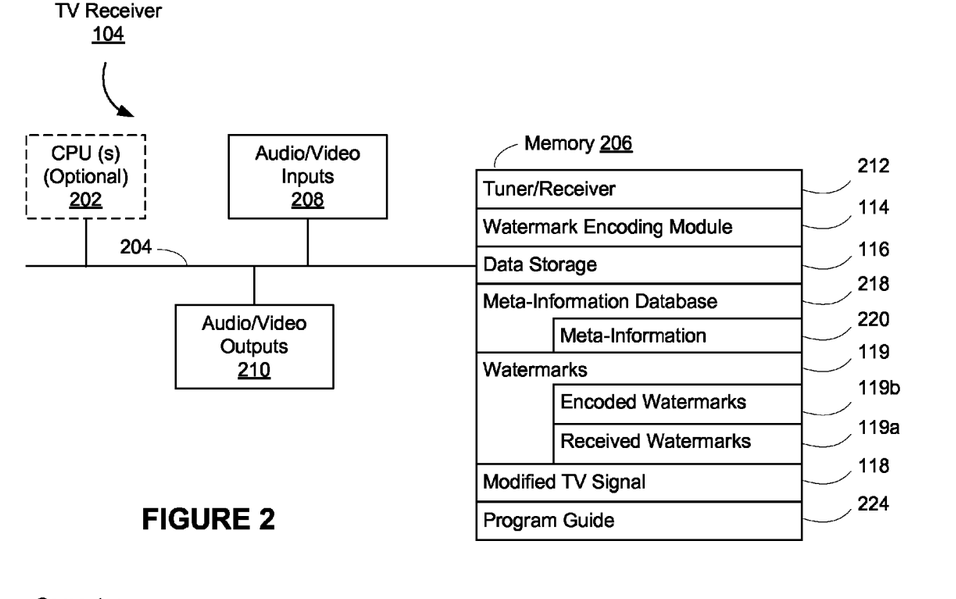
FIG. 2 is a block diagram illustrating the structure of an exemplary TV receiver in accordance with some implementations.

FIG. 2 is a block diagram illustrating a TV receiver 104 in accordance with some implementations. The TV receiver 104 is an electronic device that optionally includes one or more processing units (CPU(s)) 202, one or more audio/video inputs 208, one or more audio/video outputs 210, memory 206, and one or more communication buses 204 for interconnecting these components.

The audio/video inputs and outputs 208, 210 are physical interfaces for establishing connections between various components or devices of the TV system 100, or any other devices for connection to a TV receiver 104. For example, in some implementations, the audio/video inputs and outputs 208, 210 include connectors for HDMI cables, coaxial cables, VGA cables, optical cables, and the like. In some implementations, the audio/video inputs and outputs 208, 210 enable wireless communications between devices. Accordingly, the audio/video inputs and outputs 208, 210 can be configured to enable communications with various components of the TV system 100, including the first source 102, the TV receiver 104, the computer system 106, and the display device 106.

The memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, including the non-volatile and volatile memory device(s) within the memory 206, comprises a computer readable storage medium. In some implementations, the memory 206 or the non-transitory computer readable storage medium of the memory 206 stores the following programs, modules and data structures, or a subset thereof, including a tuner/receiver 212, a watermark encoding module 114, data storage 116, meta-information database 218 and watermarks 119.

The tuner/receiver 212 is configured to receive the first TV signals 112. In some implementations, the tuner/receiver 212 interfaces with the audio/video inputs and outputs 208, 210 for establishing a connection to, and receiving the first TV signals 112 from, the first source 102. In some implementations, the first source 102 is connected to the TV receiver 104, via the audio/video outputs 210, by a physical connection, such as an electrical or optical audio/video cable, as described in greater detail above.

In some implementations, the tuner/receiver 212 receives, decodes, and/or processes the first TV signals 112 in order to generate a TV signal 118 that can be displayed on a display device. For example, the tuner/receiver 212 is sometimes a cable TV receiver that receives first TV signals 112 from a cable TV provider, and provides a TV signal output 118 corresponding to a channel selected by a user. In some implementations, the tuner/receiver 212 is configured to receive cable, internet, satellite, and/or over-the-air broadcast TV signals. In some implementations, the tuner/receiver 212 receives streaming video content, including streaming movies and TV shows. In some implementations, the tuner/receiver 212 receives, from the first source 102, one or more of watermarks 119a and additional information 121 related to the first TV signals 112 and/or the content that a user has selected to view.

The watermark encoding module 114 encodes one or more watermarks 119 into a TV signal that is output to another device (e.g., as the modified TV signal 118) or that is stored internally in the data storage 116 or shown on an integrated display. In some implementations, the tuner/receiver 212 determines what channel is being watched by a user or, more generally, the channel to which the tuner/receiver 212 is tuned, and provides meta-information 220 associated with the tuned channel to the watermark encoding module 114. In some implementations, the meta-information 220 is stored in the meta-information database 218. The watermark encoding module 114, in turn, encodes one or more watermarks 119 representing the meta-information 220 into the TV signal 118 corresponding to the watched/tuned channel.

Figure 5A:
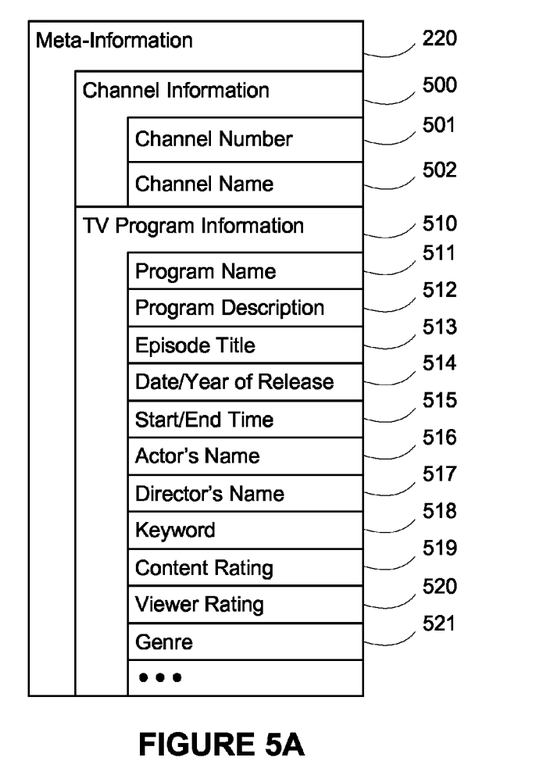
FIG. 5A is a block diagram illustrating further details of FIG. 2 in accordance with some implementations.

FIG. 5A is a block diagram illustrating meta-information 220 according to some implementations. In some implementations, the meta-information 220 includes channel information 500 associated with the TV channel being watched/tuned. In some implementations, channel information 500 includes the channel number 501 (e.g., "4") and the channel name 502 (e.g., "NBC") associated with the TV channel being watched/tuned. In some implementations, the meta-information 220 includes TV program information 510 associated with the particular TV program being carried by the TV channel being watched/tuned. For instance, in some implementations, the TV program information 510 includes a program name 511, a program description 512, an episode title 513, a date or year of release 514, a start and/or an end time for the program 515, an actor's name 516, a director's name 517, a keyword 518, a content rating 519, a viewer rating 520, a genre 521.

The TV receiver 104 determines the channel information 500 based on its internal knowledge of the channel to which it is currently tuned. In some implementations, the TV receiver 104 acquires or generates the additional TV program information 510 from any of a number of sources. For example, in some implementations, the TV receiver 104 includes in the meta-information 220 information from an internally-stored on-screen program guide 224, such as those that are included in many digital cable boxes. These program guides typically display information about the TV programs that are shown on different TV channels at a given time. Accordingly, substantial channel information 500 and/or TV program information 510 may already be accessible by, and even stored in the TV receiver 104. In some implementations, the TV receiver 104 includes in the meta-information 220 the additional information 121 from the first TV source 102.

In some implementations, the watermark encoding module 114 includes in one or more watermarks 119b some or all of the information in the on-screen program guide 224. In some implementations, the watermark encoding module 114 encodes in the modified TV signal 118 watermarks 119a that were transmitted by the first TV source 102 along with the encoded watermarks 119b.

Attention is now turned briefly to the characteristics of watermarks that are used in the present systems and methods. Watermarks include meta-information about the TV channel in which the watermark is encoded. For example, if the TV receiver 104 is outputting a signal corresponding to a particular TV channel, the watermark sometimes includes meta-information about the channel, such as the name of the channel and/or the numerical channel number. In some implementations, the meta-information includes TV program information corresponding to the particular TV program that is being shown on the TV channel. In some implementations, the TV program information includes any of a group comprising a program name, a program description, an episode title, a date or year of release, a start and/or an end time for the program, an actor's name, a director's name, a keyword, a content rating, a user rating, a genre, etc. In some implementations, watermarks include information about topics, subjects, products, and/or people in the actual TV program. For instance, in some implementations, the watermark will include a name or description of a topic that is being discussed by characters in a TV show. In some implementations, the watermark includes a name of a product that is being consumed, used, or referenced in a TV show.

Many different types and methods of watermarking may be used in the present systems and methods. For example, the watermarks may be encoded into TV signals using a number of methods of watermarking, including spread-spectrum watermarking (i.e., additive modification in a transform or time domain), quantization, and/or amplitude modulation (i.e., additive modification in a spatial domain). In some implementations, the watermark encoded by the watermarking module 114 is digital data that is detectable by a separate device (e.g., the computer system 106 and the mobile device 108). In some implementations, the watermark is configured so that if the modified TV signal 118 is sent to the display device 110 with a watermark still encoded therein, the video and/or audio quality will not be substantially affected. In other words, the digital data of the watermark interferes so little with the audio or video components of the TV signal that a user will be unable to perceive the presence of the watermark simply by watching or listening to the TV. Though it may be imperceptible to a person, an audio watermark (such as the watermark in the audio stream 120) may be detectable by an electronic device that is configured to receive and decode audio watermarks, as described in greater detail below with respect to FIG. 4. Nonetheless, in some implementations, watermarks are removed from a TV signal before they are sent to the display device 110 for viewing, for example, by the watermark decoding module 124 of the computer system 106.

In some implementations, the data in a watermark 119 represents meta-information (e.g., meta-information 220) for a displayed TV channel or program. For example, in some implementations, the watermark 119 includes the channel number (e.g., "Channel Number: 4") and/or additional program information (e.g., "Program Title: Seinfeld"). In some implementations, the data in a watermark includes a reference code that can be used by another device to look up information relating to the TV signal. For example, in some implementations, the computer system 106 retrieves meta-information based on the reference code, as discussed in greater detail below with reference to FIG. 3.

Figure 8:
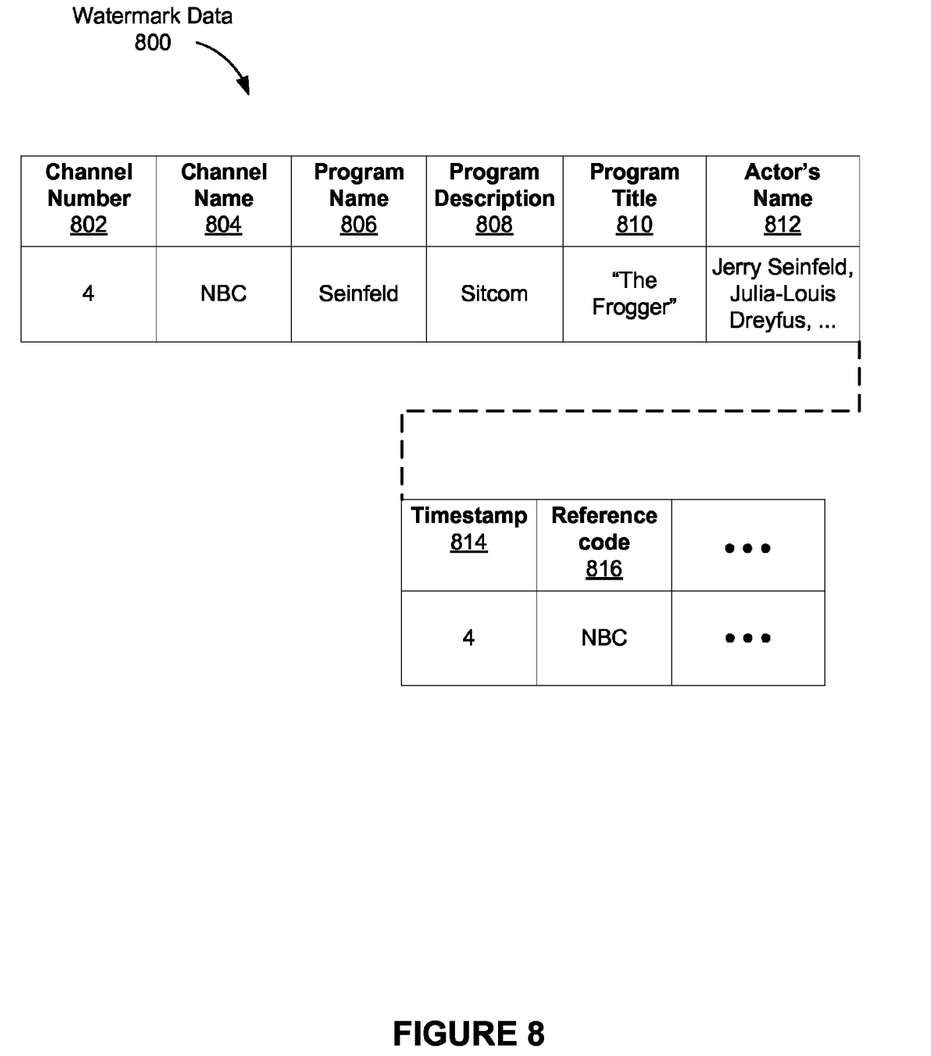
FIG. 8 is a block diagram illustrating an exemplary data structure of meta-information, in accordance with some implementations.

FIG. 8 illustrates an exemplary data structure 800 of information encoded into a watermark 119 including a variety of meta-information, according to some implementations. The watermark data 800 includes channel number 802, channel name 804, program name 806, program description 808, program title 810, actor's name 812, a time stamp 814 associated with the meta-information 800, and a reference code 816. The channel number 802 corresponds to the numerical channel number of a channel being displayed, such as the number "4" for channel 4. The channel name 804 indicates the name of the channel or network that is being displayed, such as "NBC" or National Broadcasting Company. The program name 806 indicates the name of the program being displayed, such as the TV show "Seinfeld." The program description 808 indicates a description of the displayed program, such as "Sitcom." The program title 810 indicates a title of the program or episode that is being displayed, such as Seinfeld's episode entitled "The Frogger." The actor's name 812 includes the name of one or more actors in the show that is being displayed, such as "Jerry Seinfeld, Julia Louis-Dreyfus, . . . " in the case of the show Seinfeld. The watermark 800 also optionally includes other data as well, including any information from meta-information 220.

Returning to the operations of the watermark encoding module 114 of the TV receiver 104, more details of the watermarks are described. In some implementations, the watermark encoding module 114 periodically updates the watermarks depending on various factors. For example, the watermark encoding module 114 sometimes encodes a watermark 119 into the modified TV signal 118 only when there is a change in the TV channel or TV program that is being transmitted on the modified TV signal 118, such as when a user changes the channel of the TV receiver 104, or when the TV program on a displayed channel transitions to a new TV program. In some implementations, the watermark encoding module 114 encodes watermarks 119 into the TV signal 118 cyclically. For instance, a watermark 119 is sometimes encoded at intervals of 5 minutes, 1 minute, 10 seconds, or 1 second. In some implementations, watermarks 119 are encoded in the TV signal 118 immediately after one another with no significant delay between them.

In some implementations, a watermark 119 containing updated meta-information is encoded by the watermark encoding module 114 whenever there is a change in any part of the meta-information. In some implementations, the watermark encoding module 114 encodes a watermark cyclically, as describe above, regardless of whether the meta-information has changed, and additionally encodes a watermark containing updated information when a change is detected in the meta-information. For example, the watermark encoding module 114 may encode a watermark into a TV signal every 5 minutes as a matter of course, but also encodes a watermark immediately after a user changes the channel on the TV receiver 104, even between the 5 minute intervals. In another example, in some implementations, the meta-information contains information relating to specific scenes of a TV program (e.g., the topics being discussed in a news program). Accordingly, the watermark encoding module 114 may encode an updated watermark when the topic being discussed changes, resulting in a change in the meta-information.

While the watermark encoding module 114 is described here as part of the TV receiver 104, in some implementations, watermarks 119 are encoded into TV signals by other devices or by other participants in the TV programming and distribution chain. Watermarks can be included in TV signals by TV content providers, such as a satellite TV, cable TV, or broadcast TV provider, or by TV content creators, such as a production studio or TV producer. For example, in some implementations, a TV content creator (e.g., a production studio, a TV producer, etc.) includes watermarks in the programs that they provide to TV content providers. For instance, a production studio may create an episode of a sitcom, and include a watermark in the data medium storing the audio and/or video data of the episode. The episode, along with the watermark, is then transmitted by the TV content provider to devices that can decode the watermark, such as the computer system 106.

Also, watermarks in accordance with the described implementations may be used together or separately. For example, in some implementations, TV content creators encode watermarks with TV program information (e.g., the name of the TV program, names of actors, etc.), while the TV receiver 104 encodes a watermark with the channel number associated with the channel being displayed. Both watermarks 119 are therefore contained in the modified TV signal 118, and can both be decoded by the computer system 106.

In some implementations, the TV receiver 104 includes data storage 116. For example, in some implementations, the TV receiver 104 includes a digital video recorder for storing recorded TV programs for later viewing by a user. In some implementations, the watermark encoding module 114 stores the modified TV signal (which contains one or more watermarks) in the data storage 116. Accordingly, when a user selects the stored TV program for playback, the TV receiver 104 outputs the modified TV signal 118, which can then be processed by other devices to read the watermark and identify the meta-information associated with that program.

As noted above, in some implementations, the watermarks 119b encoded by the watermark encoding module 114 include only a small amount of content in the meta-information 220, but include at least the channel number of the active TV channel (e.g., channel information 500). As described in greater detail below, devices receiving the watermark 119 may consult a lookup table or database (such as a TV program guide database) to determine additional meta-information for the active TV channel based on the encoded channel number and the then current time of day (i.e., the time of day when that TV channel was active). However, devices may not be able to differentiate between "live" TV signals and locally stored TV signals. Thus, in some implementations, the watermark encoding module 114 includes in the watermark a time stamp (e.g., timestamp 814) corresponding to the original transmission time of the recorded TV signal. Thus, subsequent devices can consult historical TV program guides using the channel number and the time stamp to determine the TV program that is carried on the stored TV signal.

Figure 3:
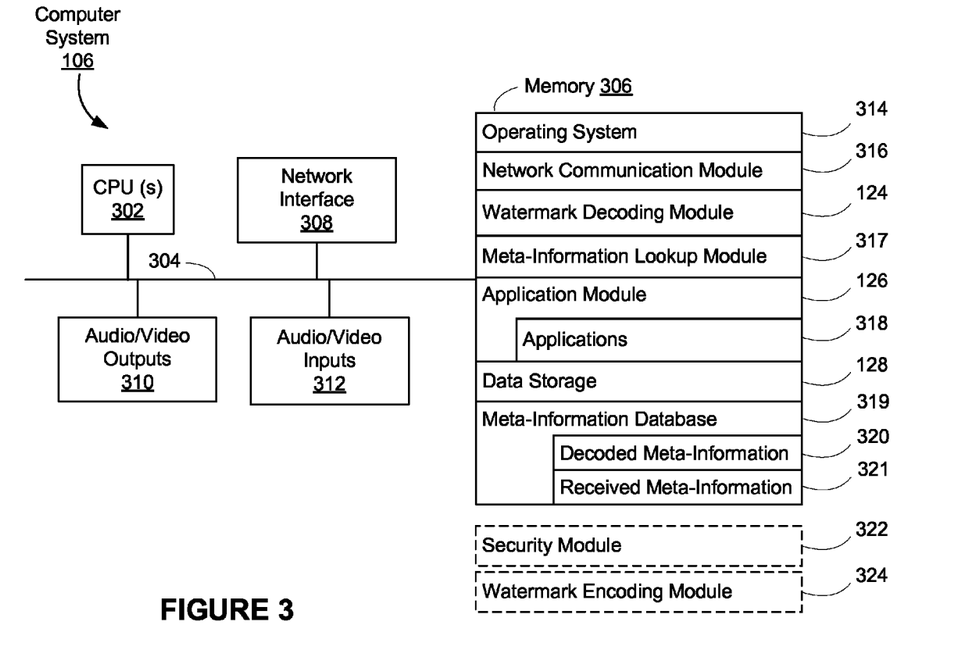
FIG. 3 is a block diagram illustrating the structure of an exemplary computer system in accordance with some implementations.

FIG. 3 is a block diagram illustrating a computer system 106, in accordance with some implementations. The computer system 106 is an electronic device that includes one or more processing units (CPU(s)) 302, a network interface 308, one or more audio/video inputs 310, one or more audio/video outputs 312, memory 306, and one or more communication buses 304 for interconnecting these components.

The audio/video inputs and outputs 310, 312 are physical interfaces for establishing connections between various components or devices of the TV system 100, or any other devices for connection to a computer system 106. For example, in some implementations, the audio/video inputs and outputs 310, 312 include connectors for HDMI cables, coaxial cables, VGA cables, optical cables, and the like. In some implementations, the audio/video inputs and outputs 310, 312 enable wireless communications between devices. Accordingly, the audio/video inputs and outputs 310, 312 can be configured to enable communications with various components of the TV system 100, including the first source 102, the TV receiver 104, the, and the display device 110. In some implementations, the audio/video inputs 312 are configured to receive the modified TV signal 118 from the TV receiver 104, such that the modified TV signal is available to the computer system 106.

The memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302. The memory 306, including the non-volatile and volatile memory device(s) within the memory 306, comprises a computer readable storage medium. In some implementations, the memory 306 or the non-transitory computer readable storage medium of the memory 306 stores the following programs, modules and data structures, or a subset thereof including an operating system 314, a network communication module 316, a watermark decoding module 124, a meta-information lookup module 317, an application module 126, data storage 128, meta-information database 319 and, optionally, a security module 322 and a watermark encoding module 324.

The operating system 314 includes procedures for handling various basic system services and for performing hardware dependent tasks.

The network communication module 316 facilitates communication with other devices via the one or more communication network interfaces 308 (wired or wireless) and one or more communication networks, such as the Internet 140, one or more cellular data networks, other wide area networks, local area networks, metropolitan area networks, and so on.

The watermark decoding module 124 decodes watermarks 119 contained in the modified TV signal 118. In some implementations, the watermark decoding module 124 reads the watermark 119 to identify, recover, decipher, or otherwise acquire the meta-information 220 (FIG. 2) that was encoded by the watermark encoding module 114. In some implementations, the watermark decoding module 124 outputs decoded meta-information 320 to an application module 126, discussed in greater detail herein. In some implementations, the decoded meta-information 320 is stored in meta-information database 319. In some implementations, decoded meta-information 320 contains at least a subset of the data shown in meta-information 220, as described above with reference to FIG. 5A. In some implementations, the watermark decoding module 124 removes the watermark 119 from the modified TV signal 118 before the computer system 106 outputs the second TV signal 122.

As mentioned above, in some implementations, the data in a watermark 119 includes a reference code 816 (FIG. 8) that the computer system 106 can use to look up meta-information. For example, in some implementations, the meta-information lookup module 317 retrieves meta-information based on the reference code 816. Specifically, the watermark decoding module 124 decodes the watermark 119 encoded in the modified TV signal 118 to obtain the reference code 816. The meta-information lookup module 317 receives the reference code 816 from the watermark decoding module 124 and sends the reference code to another source, such as the server 111, via a communication network 140. The server 111 then refers to a look-up table or other database stored at the server 111 to determine the meta-information that corresponds to the reference code, and returns the meta-information to the meta-information lookup module 317. In some implementations, the returned meta-information is stored in the meta-information database 319 in received meta-information 321. In some implementations, received meta-information 321 contains at least a subset of the data shown in meta-information 220, as described above with reference to FIG. 5A. In some implementations, the meta-information lookup module 317 receives and locally stores the data that is used to determine meta-information. For example, the meta-information lookup module 317 is configured to receive from the server 111 a look-up table or database (or data with which to populate a database) that can be stored locally in the data storage 128.

In some implementations where only a channel number or channel name are encoded into a watermark 119, the lookup module 317 acquires or identifies (e.g., from Internet-based servers or server systems) additional meta-information for a TV signal 118 by referencing an online or locally-stored TV program guide. For instance, in some implementations, the watermark decoding module 124 decodes a channel number (e.g., channel number 802) from a watermark and provides the channel number to the lookup module 317. In some implementations, the watermark decoding module 124 also provides a time (e.g., from a time stamp 814 indicating the time that the channel was recorded) to the lookup module 317. The lookup module 317 then uses the TV channel number and either the current time or the time stamp 814 to determine what program is currently active on that channel. In some implementations, the returned meta-information is stored in the meta-information database 319 in received meta-information 321. Program guides and other references may be located on a server 111 that is accessible via the communication network 140. The program guides described herein may include, and may provide to the computer system 106, any meta-information described above with reference to FIG. 5A, including channel information 500 and TV program information 510.

In some implementations, the watermark decoding module 124 is configured to decode multiple watermark formats. This may be advantageous if different models or brands of TV receivers encode watermarks in different formats, or if the different sources (e.g., the TV content providers or TV content creators) include watermarks of different formats. For example, different TV receivers may encode watermarks using various formats, including spread-spectrum watermarks, quantization watermarks, or amplitude-modulation watermarks. Also, the watermarks included by a TV content creator or a TV content provider may be in different formats than those encoded by a TV receiver. In order to account for the multiple different watermark formats, the watermark decoding module 124 is sometimes configured to decode any or all of these types of watermarks. Similarly, the watermark decoding module 124 is also sometimes configured to decode watermarks that utilize reference codes as well as those that include directly-coded meta-information.

In some implementations, the watermark decoding module 126 identifies a type of watermark encoded in a TV signal, and selects a decoding scheme from a plurality of decoding schemes in accordance with the identified type of watermark. Furthermore, because multiple watermarks can be present in a TV signal, the watermark decoding module 126 in some implementations includes instructions for compiling and normalizing the meta-information contained in the watermarks. For instance, if a TV signal has multiple watermarks that each contain the name of the active TV program, the watermark decoding module 126 can identify the duplicate information, normalize the information, and store (or send to the application module 126) the normalized TV program name.

In some implementations, the computer system 106 optionally includes a watermark encoding module 324 for encoding an audio watermark 119c into the displayed TV signal 122, so that the audio watermark 119c is included in the audio stream 120. In some implementations, the audio watermark 119c includes at least a subset of the meta-information that was encoded by the watermark encoding module 114. In some implementations, the audio watermark 119c includes information that the computer system 106 received from an internet based source, such as the server 111. For example, in some implementations, the watermark decoding module 124 decodes a watermark from the modified TV signal 118 to identify the channel associated with the modified TV signal 118. The computer system 106 accesses the server 111 and determines, based on the channel of the modified TV signal and other information (e.g., the time of day), the TV program information associated with the modified TV signal 118. The computer system 106 then encodes the TV program information in the audio watermark 119c, which is included in an audio component of the displayed TV signal 122, and is thus included in the audio stream 120.

The computer system 106 also includes an application module 126. The application module 126 includes, and is configured to execute, one or more applications 318-i, described in greater detail herein with reference to FIG. 5B.

In some implementations, the computer system 106 includes a security module 322. Because the computer system 106 may determine what TV channels or programs a user is viewing, it is sometimes beneficial to provide data security measures to help limit unauthorized access to that information. Accordingly, security module 322 encrypts or otherwise protects the meta-information 320, 321 so that devices other than the computer system 106 cannot access or decipher the meta-information 320, 321. Because most encryption techniques cannot prevent all unauthorized access to the encrypted data, it is understood that the encryption methods in these implementations conform to standard encryption techniques.

Figure 4:
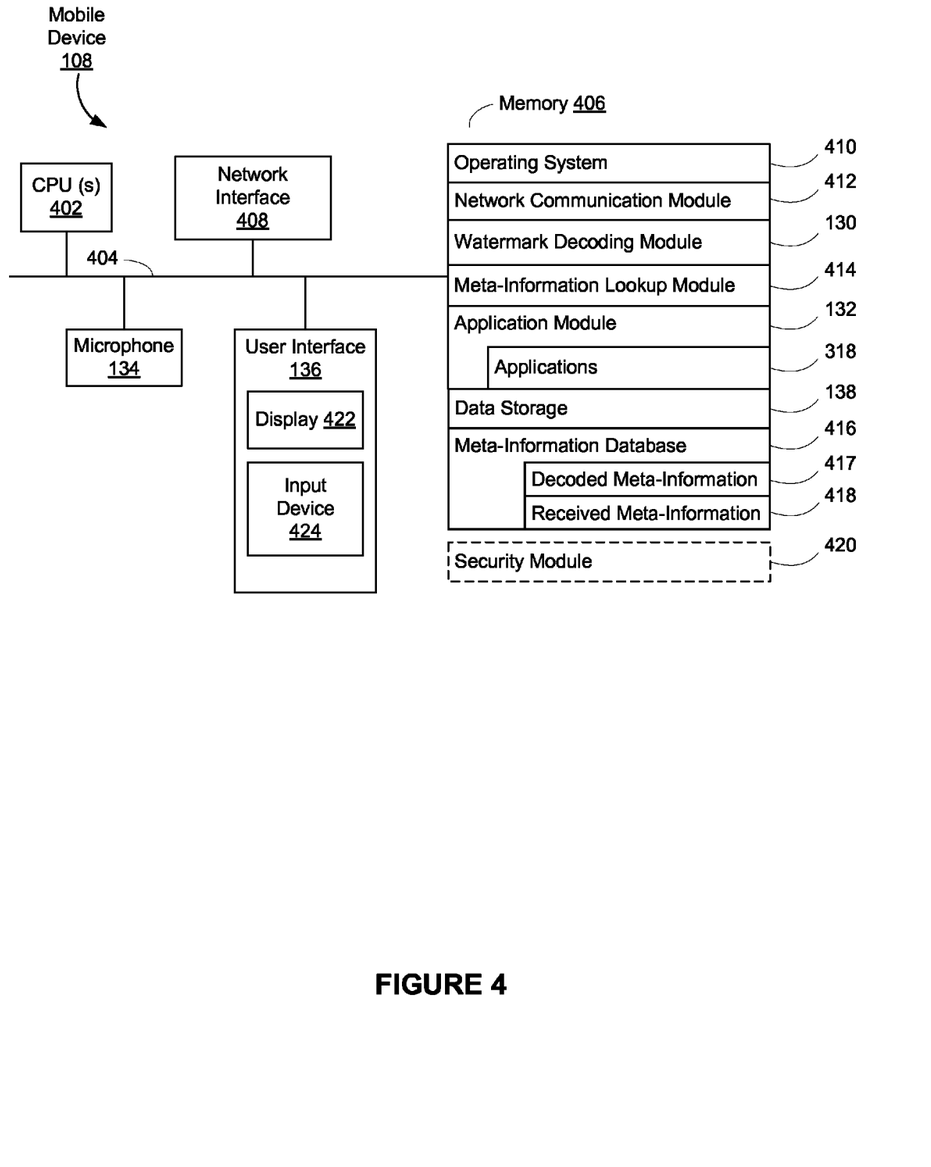
FIG. 4 is a block diagram illustrating the structure of exemplary mobile devices in accordance with some implementations.

FIG. 4 is a block diagram illustrating a mobile device 108, in accordance with some implementations. The mobile device 108 is an electronic device that includes one or more processing units (CPU(s)) 402, a network interface 408, a user interface 136, a microphone 134, memory 406, and one or more communication buses 404 for interconnecting these components. In some implementations, the mobile device 108 is any one of: a mobile phone, an audio player, a video player, a video game system, a laptop computer, a tablet computer, and/or any other handheld or portable electronic device.

The memory 406 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 406 may optionally include one or more storage devices remotely located from the CPU(s) 402. The memory 406, including the non-volatile and volatile memory device(s) within the memory 406, comprises a computer readable storage medium. In some implementations, the memory 406 or the non-transitory computer readable storage medium of the memory 406 stores the following programs, modules and data structures, or a subset thereof, including an operating system 410, a network communication module 412, a watermark decoding module 130, a meta-information lookup module 414, an application module 132, data storage 138, meta-information database 416, and, optionally, a security module 420.

The operating system 410 includes procedures for handling various basic system services and for performing hardware dependent tasks.

The network communication module 412 facilitates communication with other devices via the one or more communication network interfaces 408 (wired or wireless) and one or more communication networks 140, such as the Internet, one or more cellular data networks, or other wide area networks, local area networks, metropolitan area networks, and so on.

The user interface 136 facilitates user interaction with the mobile device 108. In some implementations, the user interface 136 includes a display 422 and an input device 424 (e.g., a mouse, a keyboard, a touchpad, a touch screen, etc.).

The watermark decoding module 130 decodes watermarks, similar to the watermark decoding module 124, described above with reference to FIG. 3. However, in some implementations, instead of decoding a watermark directly from the modified TV signal 118, the watermark decoding module 130 decodes a watermark contained in the audio stream 120. For example, in some implementations, the microphone 134 of the mobile device 108 receives the audio stream 120, and provides the audio stream 120 (or a data signal corresponding to the audio stream) to the watermark decoding module 130. The watermark decoding module 130 then processes the audio stream 120, and reads the watermark to identify, recover, decipher, or otherwise acquire the meta-information that is contained therein. In some implementations, the watermark was encoded in the audio stream 120 by the TV receiver 104, or by a TV content provider or TV content creator, as described in greater detail above. In some implementations, the watermark decoding module 130 outputs decoded meta-information 417 to an application module 132, discussed in greater detail herein. In some implementations, decoded meta-information 417 contains at least a subset of the data shown in meta-information 220, as described above with reference to FIG. 5A. In some implementations, the decoded meta-information 417 is stored in meta-information database 416.

In some implementations, the data in a watermark 119c includes a reference code 816 (FIG. 8) that the mobile device 108 can use to look up meta-information. For example, in some implementations, the meta-information lookup module 414 retrieves meta-information based on the reference code 816. Specifically, the watermark decoding module 130 decodes the watermark 119c encoded in the audio stream 120 to obtain the reference code 816. The meta-information lookup module 414 receives the reference code 816 from the watermark decoding module 130 and sends the reference code to another source, such as the server 111, via a communication network 140. The server 111 then refers to a look-up table or other database stored at the server 111 to determine the meta-information that corresponds to the reference code, and returns the meta-information to the meta-information lookup module 414. In some implementations, the returned meta-information is stored in the meta-information database 416 in received meta-information 418. In some implementations, received meta-information 418 contains at least a subset of the data shown in meta-information 220, as described above with reference to FIG. 5A. In some implementations, the meta-information lookup module 414 receives and locally stores the data that is used to determine meta-information. For example, the meta-information lookup module 414 is configured to receive from the server 111 a look-up table or database (or data with which to populate a database) that can be stored locally in the data storage 138.

In some implementations where only channel information, such as channel number or name, are encoded into the audio watermark 119c, the lookup module 414 acquires or identifies (e.g., from Internet-based servers or server systems) meta-information for a TV signal by referencing a TV program guide. For instance, in some implementations, the watermark decoding module 130 decodes a channel number from a watermark and provides the channel number to the lookup module 414. In some implementations, the watermark decoding module 130 also provides a time (e.g., from the time stamp 814 indicating the time that the channel was recorded) to the lookup module 414. The lookup module 414 then uses the TV channel number and either the current time or the time stamp 814 to determine what program is currently active on that channel. Program guides and other references may be located on a server 111 that is accessible via the communication network 140. The program guides described herein may include, and may provide to the mobile device 108, any meta-information described above with reference to FIG. 5A, including channel information 500 and TV program information 510.

In some implementations, the watermark decoding module 130 is configured to decode multiple watermark formats. This may be advantageous if different models or brands of TV receivers encode watermarks in different formats, or if the different sources (e.g., the TV content providers or TV content creators) include watermarks of different formats. For example, different TV receivers may encode watermarks using various formats, including spread-spectrum watermarks, quantization watermarks, or amplitude-modulation watermarks. Also, the watermarks included by a TV content creator or a TV content provider may be in different formats than those encoded by a TV receiver. In order to account for the multiple different watermark formats, the watermark decoding module 130 is sometimes configured to decode any or all of these types of watermarks.

In some implementations, the watermark decoding module 130 identifies a type of watermark encoded in a TV signal, and selects a decoding scheme from a plurality of decoding schemes in accordance with the identified type of watermark. Furthermore, because multiple watermarks can be present in a TV signal, the watermark decoding module 130 in some implementations includes instructions for compiling and normalizing the meta-information contained in the watermarks. For instance, if a TV signal has multiple watermarks that each contain the name of the active TV program, the watermark decoding module 130 can identify the duplicate information, normalize the information, and store (or send to the application module 132) the normalized TV program name.

The mobile device 108 also includes an application module 132. The application module 132 includes, and is configured to execute, one or more applications 318-i, described in greater detail herein with reference to FIG. 5B.

In some implementations, the mobile device 108 includes a security module 420. Because the mobile device 108 may determine what TV channels or programs a user is viewing, it is sometimes beneficial to provide data security measures to help limit unauthorized access to that information. Accordingly, security module 420 encrypts or otherwise protects the meta-information 417, 418 so that devices other than the mobile device 108 cannot access or decipher the meta-information 417, 418. Because most encryption techniques cannot prevent all unauthorized access to the encrypted data, it is understood that the encryption methods in these implementations conform to standard encryption techniques.

Figure 5B:
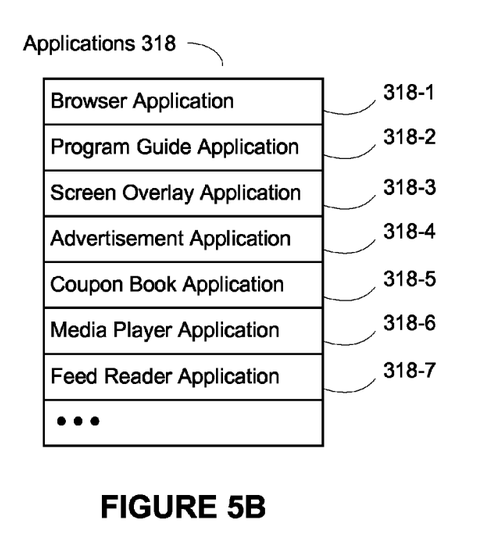
FIG. 5B is a block diagram illustrating further details of FIGS. 3 and 4 in accordance with some implementations.

FIG. 5B is a block diagram illustrating the applications 318-i, in accordance with some implementations. The application modules 126, 132 include, and are configured to execute, one or more of the applications 318-i. In some implementations, the one or more applications 318-i include a browser application 318-1, a program guide application 318-2, a screen-overlay application 318-3, an advertisement application 318-4, a coupon book application 318-5, a media player application 318-6, and/or a feed reader application 318-7. In some implementations, the one or more applications 318-i receive, and execute in accordance with, the meta-information associated with a displayed TV channel.

For example, in some implementations, the application modules 126, 132 invoke and execute the coupon book application 318-5 to display a coupon to a user based on the meta-information 320, 321, 417, 418 (including, in some implementations, channel information and/or TV program information). In some implementations the coupon book application 318-5 stores coupons for later use, either online or at a physical store. In another example, the application modules 126, 132 invoke and execute the advertisement application 318-4 to display an advertisement to a user based on the channel or program being displayed to the user.

When the above described applications are executed by the computer system 106, the graphical interfaces associated with the applications 318-i (e.g., for the coupon book application 318-5, or the advertisements of the advertisement application 318-4) can be optimized for display on a TV display device, so that they can be presented to a user while the user is watching TV. However, when the applications 318-i are executed by the mobile device 108, the graphical interfaces may be optimized for the typically smaller screens (and different user-input capabilities) of mobile devices, and the different functionalities and user expectations associated with such devices. For example, in some implementations where the mobile device 108 is a smartphone, a user may be presented with advertisements corresponding to a watched TV show only if the user is actively using the smartphone while the TV show is being watched.

In some implementations, one or more of the applications 318-i are downloaded from a server 111 based on the meta-information 320, 321, 417, 418. For example, if a particular channel or TV program is being displayed, an application that is related to that channel or TV program (or an application that is tailored to provide content related to that channel or TV program) may be downloaded for execution by the application modules 126, 132. For example, a TV program such as "60 Minutes" may have an application that is configured to display to a viewer additional information about the news stories being reported. In some implementations, an application is automatically downloaded if the computer system 106 or the mobile device 108 determines that a particular TV program is being displayed. In some implementations, an application is downloaded in response to a viewer's selection of the application.

In some implementations, the application modules 126, 132 invoke an application 318-i and also direct the invoked application 318-i to download one or more related digital content items from a remote source, such as a server 111. For example, the application modules 126, 132 may invoke a feed reader module to cause the feed reader device to download content items relating to an actor in a show being displayed to a user (such as posts about the actor from an entertainment web site). In another example, the application modules 126, 132 may generate instructions to invoke a browser and instructions to cause the browser to navigate to a particular website (e.g., a product website) or a wiki related to the channel or content associated with a program being displayed.

The applications 318-*i* discussed above are described solely in terms of functionality and are not intended to refer to a specific set of instructions or software code. Furthermore, while the applications 318-*i* are described as being executed by the application modules of the computer system 106 as well as the mobile device 108, the specific instructions for executing the applications may differ based on the device on which it is intended to run. For example, applications 318-*i* for different devices may be coded in different programming languages. Also, applications 318-*i* may be optimized for execution by a mobile device such as a "smartphone" or a tablet computer, taking into account various factors, including hardware specific factors (e.g., the available memory, screen size, and available input devices), and user-experience factors (e.g., how and when the device is used, and user preferences for level of integration with watched TV programs). On the other hand, the applications 318-*i* can also be optimized for execution on a computer system, such as an inline set-top box for use in conjunction with a TV display device, taking into account both hardware and user-experience factors associated with the set-top box and the TV display.

Figure 6:
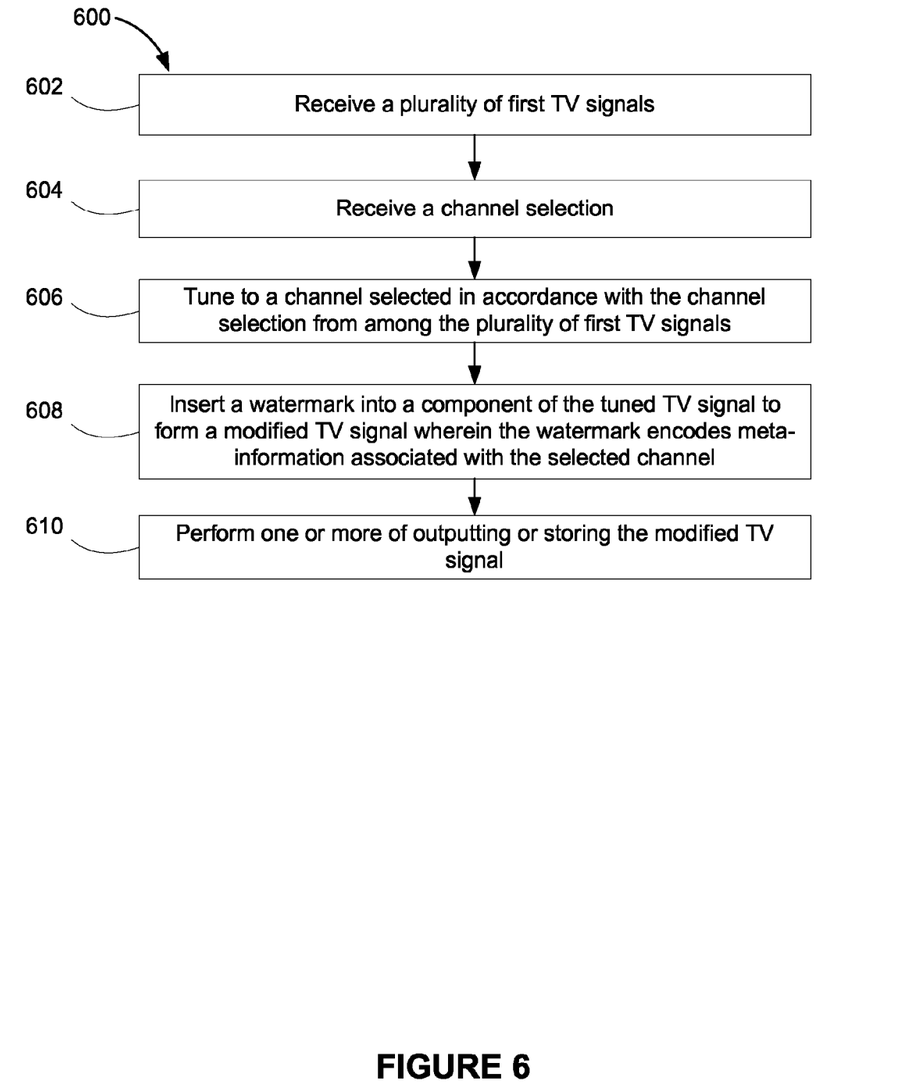
FIG. 6 is a flow chart illustrating the process of encoding meta-information of a tuned TV channel, in accordance with some implementations.

Attention is now directed to FIG. 6, which is a flow diagram illustrating a method 600 of encoding meta-information of a tuned TV channel, according to some implementations. Such methods may be useful, either alone or in conjunction with other methods described herein, for content providers desiring to provide content that is tailored to the specific channel being displayed to a user.

The method 600 is performed at a TV receiver 104 having one or more processors and memory. In some implementations, the method 600 is performed by the tuner/receiver 212 (FIG. 2) and the watermark encoding module 114 (FIG. 1). The tuner/receiver 212 receives (602) a plurality of first TV signals 112 from a first source 102 (e.g., a cable TV source). The plurality of first TV signals 112 correspond to a plurality of TV channels. In some implementations, each of the first TV signals 112 corresponds to a TV channel.

The tuner/receiver 212 receives (604) a channel selection. For example, a user will select a particular cable TV channel to view on the display device 110. The tuner/receiver 212 tunes (606) to a selected channel (e.g., a TV signal corresponding to the channel) in accordance with the channel selection from among the plurality of first TV signals 112. Thus, the tuner/receiver 212 isolates or identifies a specific TV signal corresponding to the selected channel for display to a viewer.

The watermark encoding module 114 inserts (608) a watermark 119 into a component of the tuned TV signal to form a modified TV signal 118. The watermark includes meta-information 220 associated with the selected channel. As described above, meta-information 220 can include any of: a channel number, a channel name, a program name, a program description, an episode title, a date or year of release, a start and/or end time for the program, an actor's name, a director's name, a keyword, a content rating, a user rating, a genre, a time stamp, a reference code, etc. Watermarks that are encoded according to this step are described in greater detail above with reference to FIG. 8.

The TV Receiver 104 outputs or stores (610) the modified TV signal 118. In some implementations, the TV receiver 104 outputs the modified TV signal 118 so it can be contemporaneously displayed on a display device 110. For example, the TV receiver 104 has audio/video inputs 208 and outputs 210. In some implementations, the TV receiver 104 stores the modified TV signal 118 in data storage 116 for later playback.

Figure 7:
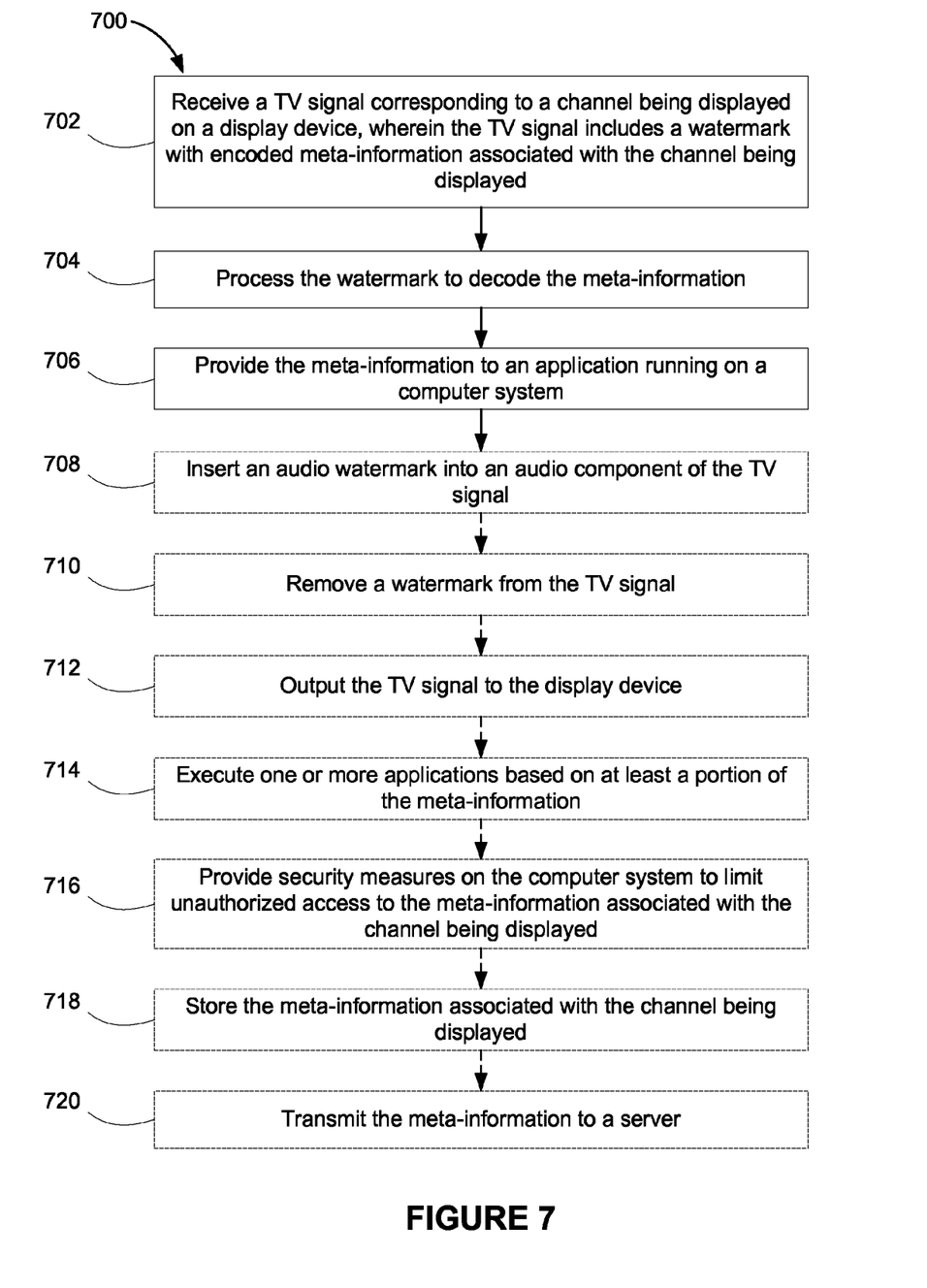
FIG. 7 is a flow chart illustrating the process of determining meta-information of a displayed TV channel, in accordance with some implementations.

Attention is now directed to FIG. 7, which is a flow diagram illustrating a method 700 determining meta-information of a displayed TV channel, according to some implementations. Such methods may be useful, either alone or in conjunction with other methods described herein, for content providers desiring to provide content that is tailored to the specific channel being displayed to a user.

The method 700 is performed at a computer system 106 or a mobile device 108 having one or more processors and memory. In some implementations, the method 700 is performed by the watermark decoding modules 124, 132 (FIG. 1).

The watermark decoding modules 124, 132 receive (702) a TV signal corresponding to a channel being displayed on the display device 108. The TV signal includes a watermark with encoded meta-information associated with the channel being displayed. As described above, meta-information can include any of: a channel number, a channel name, a program name, a program description, an episode title, a date or year of release, a start and/or end time for the program, an actor's name, a director's name, a keyword, a content rating, a user rating, a genre, etc.

In some implementations of the computer system 106, the TV signal received (702) is the modified TV signal 118 from the TV receiver 104. In some implementations, the modified TV signal 118 is received by the watermark decoding module 124 via an audio/visual cable, such as an HDMI cable. In some implementations of the mobile device 108, the TV signal received (702) is the audio stream 120 that contains a watermark 119*c* that is detectable by the watermark decoding module 130, as described in greater detail above with reference to FIG. 4.

The watermark decoding modules 124, 132 process (704) the watermark to decode the meta-information. In some implementations, the watermark includes directly encoded meta-information. In some implementations, the watermark includes a reference code that can be used to look up meta-information corresponding to the channel being displayed.

The watermark decoding modules 124, 132 provide (706) the meta-information to an application running on a computer system. As used herein, the computer system includes the computer system 106 and the mobile device 108. In some implementations, the application modules 126, 132 executes (714) the application based on at least a portion of the meta-information. Applications, and how they use the meta-information provided by the watermark decoding modules 124, 132 are described in greater detail above with reference to FIG. 5B.

In some implementations, the watermark encoding module 324 inserts (708) an audio watermark 119*c* into an audio component of the TV signal. As described above, the audio watermark 119*c*, in some implementations, is received by a mobile device with a microphone.

In some implementations, the computer system 106 outputs (712) the TV signal to the display device. For example, the computer system 106 has audio/video inputs 312 and outputs 310. In some implementations, the computer system 106 has an input for receiving the modified TV signal 118, and an output for transmitting the displayed TV signal 122 to a display device. In some implementations, the input and output for the TV signals 118, 122 are HDMI connectors. In some implementations, the input and output for the TV signals 118, 122 are coaxial connectors. In some implementations, the signal that is output to the display device includes other audio and/or video information in addition to the TV program. For example, the output sometimes includes information that causes the display device to display other information (such as program information in a screen overlay) as well as the TV programming from the modified TV signal 118.

In some implementations, the watermark decoding module 124 removes (710) a watermark from the TV signal. In some implementations, the watermark is removed (710) prior to the TV signal being output (712) by the computer system 106.

In some implementations, the security modules 322, 420 provide (716) security measures to limit unauthorized access to the meta-information 320, 321, 417, 418 associated with the channel being displayed. For example, some implementations provide for the meta-information 320, 321, 417, 418 to be encrypted according to known data encryption techniques.

In some implementations, the computer system 106 or the mobile device 108 stores (718) the meta-information associated with the channel being displayed, e.g., in the meta-information database 319, 416. In some implementations, the meta-information associated with the channel being displayed is transmitted (720) to a server. In some implementations, the decoded meta-information 320, 417, and/or the received meta-information 321, 418 is transmitted (720) to a server so that viewing trends can be compiled and/or analyzed.

The foregoing description, for purpose of explanation, has been described with reference to specific implementations. However, the illustrative discussions above are not intended to be exhaustive or to limit the disclosed ideas to the precise forms disclosed. Many modifications and variations are possible in view of the above teachings. The implementations were chosen and described in order to best explain the principles and practical applications of the disclosed ideas, to thereby enable others skilled in the art to best utilize them in various implementations with various modifications as are suited to the particular use contemplated.

Moreover, in the preceding description, numerous specific details are set forth to provide a thorough understanding of the presented ideas. However, it will be apparent to one of ordinary skill in the art that these ideas may be practiced without these particular details. In other instances, methods, procedures, components, and networks that are well known to those of ordinary skill in the art are not described in detail to avoid obscuring aspects of the ideas presented herein.

We claim:

1. A method of identifying displayed TV channels, comprising:
   at a second electronic device that does not otherwise have access to channel identification information, wherein the second electronic device includes a microphone, one or more processors, and memory storing one or more programs for execution by the one or more processors:
      using the microphone to obtain an audio stream from a first electronic device, wherein the first electronic device tunes to a selected channel, receives a digital TV signal corresponding to the tuned channel, obtains channel identification information for the tuned channel, and embeds a watermark into an audio component of the digital TV signal to form a modified TV signal, wherein the channel identification information includes a channel identifier for the tuned channel or a program identifier of a program broadcast on the tuned channel, wherein the embedded watermark encodes the channel identification information using a symbol or text, wherein the audio stream corresponds to the audio component of the modified TV signal being displayed on a first display device, and wherein the embedded watermark is encoded using spread-spectrum watermarking, quantization watermarking, or amplitude-modulation watermarking;
      identifying the tuned channel, among a plurality of TV channels, in accordance with the channel identification information by processing the watermark to decode the channel identification information; and
      providing security measures on the second electronic device to limit unauthorized access to the channel identification information, wherein the security measures include encrypting the channel identification information.

2. The method of claim 1, wherein the channel identification information includes one of:
   a channel number,
   a channel name,
   a program name,
   a program description,
   an episode title,
   a time of release, and
   a program's start or end time.

3. The method of claim 1, further comprising:
   outputting, for display on the first display device, additional information generated by an application executed on the second electronic device, based on at least a portion of the channel identification information.

4. The method of claim 1, further comprising:
   outputting, for display on a second display device, additional information generated by an application executed on the second electronic device, based on at least a portion of the channel identification information.

5. A second electronic device, comprising:
   memory;
   one or more processors;
   a microphone; and
   one or more programs stored in the memory for execution by the one or more processors, wherein
   the second electronic device does not otherwise have access to channel identification information, and
   the one or more programs include instructions for:
      using the microphone to obtain an audio stream from a first electronic device, wherein the first electronic device tunes to a selected channel, receives a digital TV signal corresponding to the tuned channel, obtains channel identification information for the tuned channel, and embeds a watermark into an audio component of the digital TV signal to form a modified TV signal, wherein the channel identification information includes a channel identifier for the tuned channel or a program identifier of a program broadcast on the tuned channel, wherein the embedded watermark encodes the channel identification information using a symbol or text, wherein the audio stream corresponds to the audio component of the modified TV signal being displayed on a first display device, and wherein the embedded watermark is encoded using spread-spectrum watermarking, quantization watermarking, or amplitude-modulation watermarking;
      identifying the tuned channel, among a plurality of TV channels, in accordance with the channel identification information by processing the watermark to decode the channel identification information; and
      providing security measures on the second electronic device to limit unauthorized access to the channel identification information, wherein the security measures include encrypting the channel identification information.

6. The electronic device of claim 5, wherein the channel identification information includes one of:
- a channel number,
- a channel name,
- a program name,
- a program description,
- an episode title,
- a time of release, and
- a program's start or end time.

7. The electronic device of claim 5, further comprising instructions for:
- outputting, for display on the first display device, additional information generated by an application executed on the electronic device, based on at least a portion of the channel identification information.

8. The electronic device of claim 5, further comprising instructions for:
- outputting, for display on a second display device, additional information generated by an application executed on the electronic device, based on at least a portion of the channel identification information.

9. A non-transitory computer readable storage medium storing one or more programs configured for execution by a second electronic device, wherein
- the second electronic device includes one or more processors,
- the second electronic device does not otherwise have access to channel identification information, and
- the one or more programs include instructions for:
  - using the microphone to obtain an audio stream from a first electronic device, wherein the first electronic device tunes to a selected channel, receives a digital TV signal corresponding to the tuned channel, obtains channel identification information for the tuned channel, and embeds a watermark into an audio component of the digital TV signal to form a modified TV signal, wherein the channel identification information includes a channel identifier for the tuned channel or a program identifier of a program broadcast on the tuned channel, wherein the embedded watermark encodes the channel identification information using a symbol or text, wherein the audio stream corresponds to the audio component of the modified TV signal being displayed on a first display device, and wherein the embedded watermark is encoded using spread-spectrum watermarking, quantization watermarking, or amplitude-modulation watermarking;
  - identifying the tuned channel, among a plurality of TV channels, in accordance with the channel identification information by processing the watermark to decode the channel identification information; and
  - providing security measures on the second electronic device to limit unauthorized access to the channel identification information, wherein the security measures include encrypting the channel identification information.

10. The non-transitory computer readable storage medium of claim 9, wherein the channel identification information includes one of:
- a channel number,
- a channel name,
- a program name,
- a program description,
- an episode title,
- a time of release, and
- a program's start or end time.

11. The non-transitory computer readable storage medium of claim 9, further comprising instructions for:
- outputting, for display on the first display device, additional information generated by an application executed on the electronic device, based on at least a portion of the channel identification information.

12. The non-transitory computer readable storage medium of claim 9, further comprising instructions for:
- outputting, for display on a display device associated with the second electronic device, additional information generated by an application executed on the second electronic device, based on at least a portion of the channel identification information.

* * * * *